United States Patent
Lee et al.

(10) Patent No.: US 9,025,667 B2
(45) Date of Patent: May 5, 2015

(54) METHOD AND APPARATUS FOR ENCODING VIDEO BY MOTION PREDICTION USING ARBITRARY PARTITION, AND METHOD AND APPARATUS FOR DECODING VIDEO BY MOTION PREDICTION USING ARBITRARY PARTITION

(71) Applicant: Samsung Electronics Co., Ltd., Suwon-si (KR)

(72) Inventors: Sun-il Lee, Yongin-si (KR); Min-su Cheon, Suwon-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/296,738

(22) Filed: Jun. 5, 2014

(65) Prior Publication Data

US 2014/0286426 A1 Sep. 25, 2014

Related U.S. Application Data

(63) Continuation of application No. 13/897,560, filed on May 20, 2013, now Pat. No. 8,780,993, which is a continuation of application No. 13/487,325, filed on Jun. 4, 2012, now Pat. No. 8,446,959, which is a (Continued)

(30) Foreign Application Priority Data

Dec. 8, 2009 (KR) .................. 10-2009-0121400

(51) Int. Cl.
*H04N 7/12* (2006.01)
*H04N 19/30* (2014.01)
(Continued)

(52) U.S. Cl.
CPC ............. *H04N 19/30* (2013.01); *H04N 19/503* (2013.01); *H04N 19/139* (2013.01);
(Continued)

(58) Field of Classification Search
CPC . H04N 19/00; H04N 19/00424; H04N 19/30; H04N 19/503; H04N 19/139; H04N 19/176; H04N 19/70; H04N 19/119; H04N 19/46; H04N 19/122; H04N 19/61; H04N 19/137; H04N 19/537; H04N 19/543; H04N 19/33; H04N 19/50; H04N 19/103
USPC .................................................. 375/240.16
See application file for complete search history.

(56) References Cited

U.S. PATENT DOCUMENTS

| 7,039,110 B2 | 5/2006 | Ernst et al. |
| 7,302,006 B2 | 11/2007 | Apostolopoulos et al. |

(Continued)

FOREIGN PATENT DOCUMENTS

| CN | 101507280 A | 8/2009 |
| CN | 101536528 A | 9/2009 |

(Continued)

OTHER PUBLICATIONS

Communication dated Sep. 12, 2014, issued by the State Intellectual Property Office in counterpart Chinese Patent Application No. 201080063102.8.

(Continued)

*Primary Examiner* — Allen Wong
(74) *Attorney, Agent, or Firm* — Sughrue Mion, PLLC

(57) ABSTRACT

A method of decoding a video including parsing AMP information indicating whether partition types include asymmetric partition types, from a bitstream of an encoded image, determining at least one coding unit included in a maximum coding unit by using split information parsed from the received bitstream, determining at least one prediction unit of a coding unit among the at least one coding unit, by using the AMP information and information about a partition type of the coding unit parsed from the received bitstream, and performing motion compensation using the prediction units for the coding unit.

4 Claims, 16 Drawing Sheets

Related U.S. Application Data continuation of application No. 13/348,224, filed on Jan. 11, 2012, now Pat. No. 8,223,843, which is a continuation of application No. 12/962,879, filed on Dec. 8, 2010.

(51) Int. Cl.
| | |
|---|---|
| H04N 19/503 | (2014.01) |
| H04N 19/139 | (2014.01) |
| H04N 19/176 | (2014.01) |
| H04N 19/70 | (2014.01) |
| H04N 19/119 | (2014.01) |
| H04N 19/46 | (2014.01) |
| H04N 19/122 | (2014.01) |
| H04N 19/61 | (2014.01) |
| H04N 19/96 | (2014.01) |
| H04N 19/137 | (2014.01) |
| H04N 19/157 | (2014.01) |
| H04N 19/537 | (2014.01) |
| H04N 19/543 | (2014.01) |
| H04N 19/33 | (2014.01) |
| H04N 19/50 | (2014.01) |
| H04N 19/103 | (2014.01) |

(52) U.S. Cl.
CPC ............ *H04N 19/176* (2013.01); *H04N 19/70* (2013.01); *H04N 19/119* (2013.01); *H04N 19/46* (2013.01); *H04N 19/122* (2013.01); *H04N 19/61* (2013.01); *H04N 19/96* (2013.01); *H04N 19/103* (2013.01); *H04N 19/137* (2013.01); *H04N 19/157* (2013.01); *H04N 19/537* (2013.01); *H04N 19/543* (2013.01); *H04N 19/33* (2013.01); *H04N 19/50* (2013.01)

(56) References Cited

U.S. PATENT DOCUMENTS

| | | | |
|---|---|---|---|
| 7,356,148 | B2 | 4/2008 | Hayashi |
| 7,881,387 | B2 | 2/2011 | Han et al. |
| 8,149,910 | B2 | 4/2012 | Tanizawa et al. |
| 8,223,843 | B2 | 7/2012 | Lee et al. |
| 8,363,936 | B2 | 1/2013 | Divorra Escoda et al. |
| 2003/0007667 | A1 | 1/2003 | Ernst et al. |
| 2003/0035477 | A1 | 2/2003 | Sekiguchi et al. |
| 2003/0202602 | A1 | 10/2003 | Apostolopoulos et al. |
| 2004/0081238 | A1 | 4/2004 | Parhy |
| 2004/0153674 | A1 | 8/2004 | Hayashi |
| 2007/0076795 | A1 | 4/2007 | Lee |
| 2007/0147503 | A1 | 6/2007 | Ikeda et al. |
| 2008/0101707 | A1 | 5/2008 | Mukherjee et al. |
| 2009/0046781 | A1 | 2/2009 | Moriya et al. |
| 2009/0196517 | A1 | 8/2009 | Divorra Escoda et al. |
| 2010/0086032 | A1 | 4/2010 | Chen et al. |
| 2011/0103475 | A1 | 5/2011 | Alshina et al. |

FOREIGN PATENT DOCUMENTS

| | | |
|---|---|---|
| EP | 1 407 613 A1 | 4/2004 |
| EP | 1 771 008 A2 | 4/2007 |
| EP | 2 106 146 A2 | 9/2009 |
| EP | 2 547 107 A2 | 1/2013 |
| JP | 10-178639 A | 6/1998 |
| JP | 11-46367 A | 5/1999 |
| JP | 11-64305 A | 6/1999 |
| JP | 2004-140667 A | 5/2004 |
| JP | 2004-534336 A | 11/2004 |
| JP | 2005-176073 A | 6/2005 |
| JP | 2005524319 A | 8/2005 |
| KR | 1020030029933 A | 4/2003 |
| RU | 2 337 503 C1 | 10/2008 |
| RU | 2 342 804 C2 | 12/2008 |
| RU | 2 369 038 C1 | 9/2009 |
| WO | 03/005727 A1 | 1/2003 |
| WO | 2005/122592 A1 | 12/2005 |
| WO | 2007/034918 A1 | 3/2007 |
| WO | 2008/027192 A2 | 3/2008 |
| WO | 2010/002214 A2 | 1/2010 |
| WO | 2010/039728 A2 | 4/2010 |
| WO | 2011/001078 A1 | 1/2011 |
| WO | 2012/044935 A1 | 4/2012 |

OTHER PUBLICATIONS

International Search Report (PCT/ISA/210) and Written Opinion (PCT/ISA/237) dated Jul. 1, 2011, in International Application No. PCT/KR2010/008735.
Communication dated Apr. 18, 2013 issued by the Australian Patent Office in counterpart Australian Patent Application No. 2010328813.
Communication dated Sep. 26, 2013 issued by the European Patent Office in counterpart European Patent Application No. 10836203.9.
Communication dated Sep. 26, 2013 issued by the European Patent Office in counterpart European Patent Application No. 13167741.1.
Communication dated Sep. 26, 2013 issued by the European Patent Office in counterpart European Patent Application No. 13167742.9.
McCann, Ken, et al., "Samsung and BBC response to: Call for Proposals on Video Compression Technology," JCT-VC Meeting, Jointcollaborative Team on Video Coding of ISO/IEC JTC1/SC29/WG11 and ITU-TSG.16, Apr. 15-23, 2010, 36 pages, http://wftp3.itu.int/av-arch/jctvc-site/.
Communication, dated Oct. 8, 2013, issued by the Japanese Patent Office in counterpart Japanese Patent Application No. 2013-168576.
Communication, dated Oct. 8, 2013, issued by the Japanese Patent Office in counterpart Japanese Patent Application No. 2013-168577.
Kim, Jaeil, et al., "Enlarging MB size for high fidelity video coding beyond HD," ITU-Telecommunications Standardization Sector, Study Group 16 Question 6, Video Coding Experts Group (VCEG), 36th Meeting, Oct. 8-10, 2008, pp. 1-6.
Communication, dated Oct. 29, 2013, issued by the Federal Service for Intellectual Property in counterpart Russian Patent Application No. 2013114281.
Communication, dated Oct. 29, 2013, issued by the Federal Service for Intellectual Property in counterpart Russian Patent Application No. 2013114262.
Communication dated Nov. 27, 2013 issued by the Federal Service on Industrial Property, Patents and Trademarks in counterpart Russian Patent Application No. 2012128519.
Communication, dated May 15, 2014, issued by the Malaysian Patent Office in counterpart Malaysian Application No. PI2012002568.
Communication, dated Jul. 7, 2014, issued by the European Patent Office in counterpart European Application No. 10836203.9.
Communication, dated Jul. 7, 2014, issued by the European Patent Office in counterpart European Application No. 13167741.1.
Communication dated Dec. 24, 2014, issued by the Japanese Intellectual Property Office in counterpart Japanese Application No. 2012-543025.
Communication dated Jan. 15, 2015, issued by the Korean Intellectual Property Office in counterpart Korean Application No. 10-2013-0035968.
Naito, S., et al., "Efficient coding scheme for super high definition video based on extending H.264 high profile", Proc. of SPIE-IS&T Electronic Imaging, SPIE vol. 6077, Jan. 2006, pp. 607727-1-607727-8.
Soyajeonggang et al., "Highly efficient coding of ubiquitous technology video-MPEG-4 and H.264-", first edition, Apr. 20, 2005, Ohm Co., Ltd., pp. 50-66.
Kimata et al., "Verification of effects of asymmetric macro block division and the review of the mounting method in H.26L", Study report of information process society, vol. 2002, No. 106, Information process society Inc., Nov. 15, 2002, pp. 191-195.
Huipin Zhang, et.al., "Region-based coding of motion fields for low-bitrate video compression", Proceedings of the 2004 Int. Conf. on Image Processing (ICIP 2004), Oct. 2004, vol. 2, pp. 1117-1120.

(56) References Cited

OTHER PUBLICATIONS

Jaeil Kim, et.al., "Enlarging MB size for high fidelity video coding beyond HD", [online], Oct. 5, 2008, ITU—Telecommunications Standardization Sector Study Group 16 Question 6 Video Coding Experts Group (VCEG), Document:VCEG-AJ21, URL:http://wftp3.itu.int/av-arch/video-site/0810_San/VCEG-AJ21.zip.

Yamamoto, T., et.al., "Analysis on Transform and Partition Selection in Extended Block Sizes and Modification of Block Transforms", [online], Apr. 10, 2009, ITU—Telecommunications Standardization Sector Study Group 16 Question 6 Video Coding Experts Group (VCEG), Document:VCEG-AK19, URL:http://wftp3.itu.int/av-arch/video-site/0904_Yok/VCEG-AK19.zip.

CODING UNITS (1010)

```
sequence_parameter_set(){
    picture_width
    picture_height
    max_coding_unit_size
    max_coding_unit_depth
    use_independent_cu_decode_flag
    use_independent_cu_parse_flag
    use_mv_accuracy_control_flag
    use_arbitrary_direction_intra_flag
    use_frequency_domain_prediction_flag
    use_rotational_transform_flag
    use_tree_significant_map_flag
    use_multi_parameter_intra_prediction_flag
    use_advanced_motion_vector_prediction_flag
    use_adaptive_loop_filter_flag
    use_quadtree_adaptive_loop_filter_flag
    use_delta_qp_flag
    use_random_noise_generation_flag
    use_arbitrary_motion_partition_flag
    for( uiDepth = 0; uiDepth < max_coding_unit_depth; uiDepth++ ){
        mvp_mode[uiDepth]
        significant_map_mode[uiDepth]
    }
    input_sample_bit_depth
    internal_sample_bit_depth
    if( use_adaptive_loop_filter_flag && !use_quadtree_adaptive_loop_filter_flag ){
        alf_filter_length
        alf_filter_type
        alf_qbits
        alf_num_color
    }
}
```

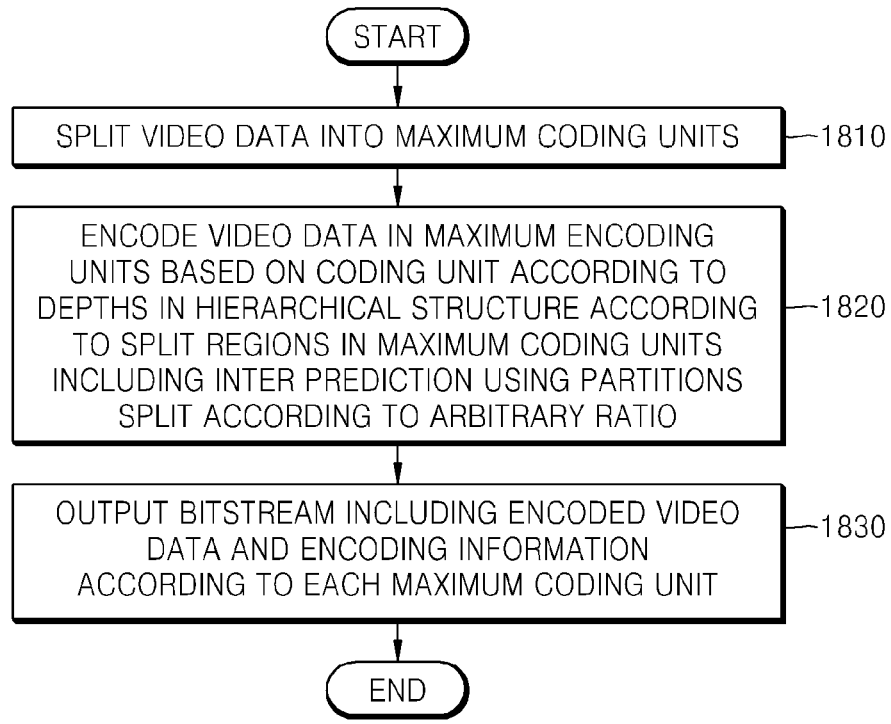
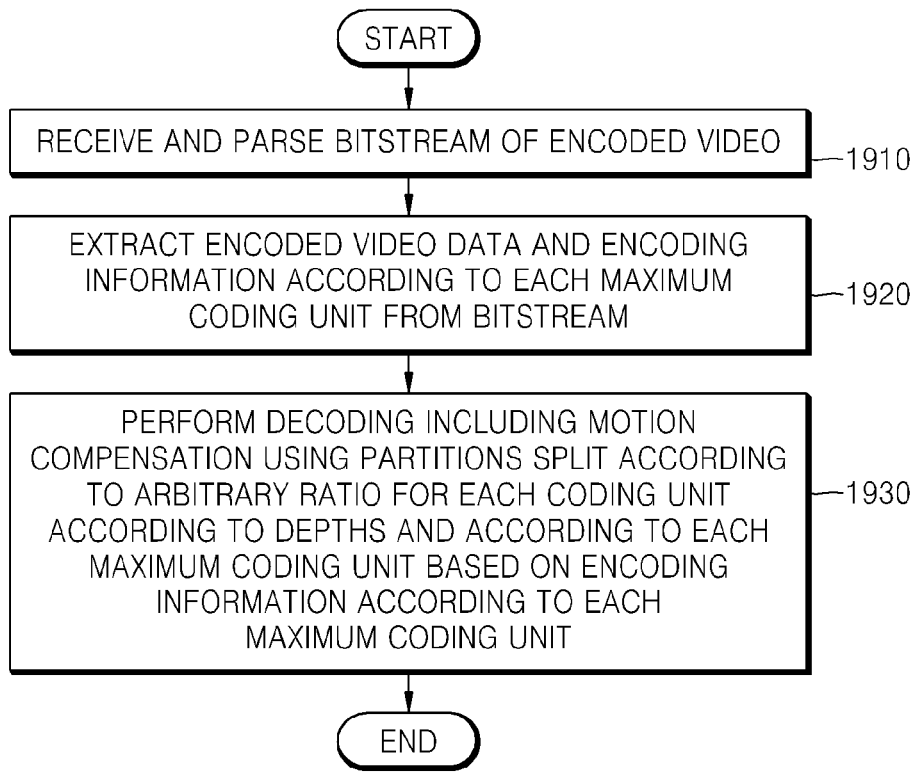

METHOD AND APPARATUS FOR ENCODING VIDEO BY MOTION PREDICTION USING ARBITRARY PARTITION, AND METHOD AND APPARATUS FOR DECODING VIDEO BY MOTION PREDICTION USING ARBITRARY PARTITION

CROSS-REFERENCE TO RELATED PATENT APPLICATION

This application is a continuation of U.S. application Ser. No. 13/897,560, filed on May 20, 2013, in the U.S. Patent and Trademark Office, which is a continuation of U.S. application Ser. No. 13/487,325 filed on Jun. 4, 2012, in the U.S. Patent and Trademark Office, which is now U.S. Pat. No. 8,446,959 issued on May 21, 2013, which is a continuation of U.S. application Ser. No. 13/348,224, filed on Jan. 11, 2012, in the U.S. Patent and Trademark Office, which is now U.S. Pat. No. 8,223,843 issued on Jul. 17, 2012, which is a continuation of U.S. application Ser. No. 12/962,879, filed on Dec. 8, 2010, in the U.S. Patent and Trademark Office, which claims priority from Korean Patent Application No. 10-2009-0121400, filed on Dec. 8, 2009, in the Korean Intellectual Property Office, the disclosures of which are incorporated herein by reference in their entireties.

BACKGROUND

1. Field

The exemplary embodiments relate to encoding and decoding a video.

2. Description of the Related Art

As hardware for reproducing and storing high resolution or high quality video content is being developed and supplied, there is increasing need for a video codec for effectively encoding or decoding the high resolution or high quality video content. In a conventional video codec, a video is encoded according to a limited encoding method based on a macroblock having a predetermined size.

Existing inter prediction performed by the video codec estimates a motion vector and estimates a motion of a 2N×2N sized macroblock by using partitions having sizes of 2N×2N, 2N×N, N×2N, and N×N of the macroblock.

SUMMARY

The exemplary embodiments provide encoding and decoding of video by performing inter prediction using arbitrary shapes of partitions.

According to an aspect of the exemplary embodiment, there is provided a method of encoding a video, the method including: splitting video data into a maximum coding unit; encoding the video data of the maximum coding unit based on deeper coding units of hierarchical structures in which a coding unit of an upper depth is split as a depth deepens, according to at least one split region of the maximum coding unit, and determining a coding depth at which an encoding result is to be output, including inter prediction using partitions obtained by splitting the coding unit according to arbitrary ratios; and outputting a bitstream including the encoded video data corresponding to a coding depth for the at least one split region according to maximum coding units and information regarding the coding depth and encoding modes.

The depth denotes the number of times a coding unit is hierarchically split, and as the depth deepens, deeper coding units according to depths may be split from the maximum coding unit to obtain minimum coding units. The depth is deepened from an upper depth to a lower depth. As the depth deepens, the number of times the maximum coding unit is split increases, and a total number of possible times the maximum coding unit is split corresponds to a maximum depth. The maximum size and the maximum depth of the coding unit may be predetermined.

The determining of the coding depth may include: selectively determining whether to perform the inter prediction using the partitions obtained by splitting the coding unit according to arbitrary ratios.

The outputting of the bitstream may include: including information indicating whether a partition type for the inter prediction includes the partitions obtained by splitting the coding unit according to arbitrary ratios.

The partitions obtained by splitting the coding unit according to arbitrary ratios may be partitions obtained by splitting a height and a width of the coding unit according to a ratio of 1:3 or 3:1.

The maximum coding unit may be selectively set as at least one of blocks having sizes of 16×16, 32×32, 64×64, 128×128, and 256×256.

The coding depth may be determined as a depth of a deeper coding unit having a highest coding efficiency among coding results based on deeper coding units according to the hierarchical structures of a corresponding split region, and is independently determined for at least one split region within the maximum coding unit.

According to another aspect of an exemplary embodiment, there is provided a method of decoding a video, the method including: receiving and parsing a bitstream regarding encoded video data; extracting the encoded video data according to maximum coding units, and information regarding coding depths and encoding modes according to maximum coding units from the bitstream; and performing decoding including motion compensation using partitions obtained by splitting a coding unit according to arbitrary ratios, for a coding unit of at least one coding depth according to maximum coding units, based on the information regarding the coding depths and encoding modes according to the maximum coding units, wherein the coding units of at least one coding depth are determined as one of depths of the deeper coding units of hierarchical structures for at least one split region of the maximum coding unit.

The extracting of the encoded video data may include: further extracting information indicating a partition type for inter prediction includes the partitions obtained by splitting the coding unit according to arbitrary ratios from the bitstream.

The performing of the decoding may include: selectively determining whether to perform motion compensation using the partitions obtained by splitting the coding unit according to arbitrary ratios based on the information indicating a partition type for inter prediction includes the partitions obtained by splitting the coding unit according to arbitrary ratios extracted from the bitstream.

According to another aspect of an exemplary embodiment, there is provided an apparatus for encoding a video, the apparatus including: a maximum coding unit splitter for splitting video data into a maximum coding unit; an encoder for encoding the video data of the maximum coding unit based on deeper coding units of hierarchical structures in which a coding unit of an upper depth is split as a depth deepens, according to at least one split region of the maximum coding unit, and determining a coding depth in which an encoding result is to be output, including inter prediction using partitions obtained by splitting the coding unit according to arbitrary ratios; and an output unit for outputting a bitstream including the encoded video data corresponding to a coding depth for the at least one split region according to maximum coding units and information regarding the coding depth and encoding modes.

According to another aspect of an exemplary embodiment, there is provided an apparatus for decoding a video, the apparatus including: a parser for receiving and parsing a bitstream regarding encoded video data; an extractor for extracting the encoded video data according to maximum coding units, and information regarding coding depths and encoding modes according to maximum coding units from the bitstream; and a decoder for performing decoding including motion compensation by using partitions obtained by splitting a coding unit according to arbitrary ratios, for a coding unit of at least one coding depth according to maximum coding units, based on the information regarding the coding depths and encoding modes according to the maximum coding units, wherein the coding units of at least one coding depth are determined as one of depths of the deeper coding units of hierarchical structures for at least one split region of the maximum coding unit.

According to another aspect of an exemplary embodiment, there is provided a computer readable recording medium having recorded thereon a program for executing the method of encoding a video. According to another aspect of an exemplary embodiment, there is provided a computer readable recording medium having recorded thereon a program for executing the method of decoding a video.

BRIEF DESCRIPTION OF THE DRAWINGS

The above and other features of the exemplary embodiment will become more apparent by describing in detail exemplary embodiments thereof with reference to the attached drawings in which:

FIG. 19 illustrates a syntax of a sequence parameter set including information regarding whether a partition type for inter prediction includes partitions obtained by splitting a coding unit according to arbitrary ratios, according to an exemplary embodiment;

FIG. 20 is a flowchart illustrating a video encoding method with respect to inter prediction using partitions split according to arbitrary ratios, according to another exemplary embodiment; and FIG. 21 is a flowchart illustrating a video decoding method with respect to inter prediction using partitions split according to arbitrary ratios, according to another exemplary embodiment.

DETAILED DESCRIPTION

Hereinafter, the exemplary embodiments will be described more fully with reference to the accompanying drawings, in which exemplary embodiments are shown. In the exemplary embodiments, "unit" may or may not refer to a unit of size, depending on its context.

Hereinafter, a 'coding unit' is an encoding data unit in which the image data is encoded at an encoder side and an encoded data unit in which the encoded image data is decoded at a decoder side, according to exemplary embodiments. Also, a 'coded depth' means a depth where a coding unit is encoded.

Hereinafter, an 'image' may denote a still image for a video or a moving image, that is, the video itself.

Encoding and decoding of video based on a spatially hierarchical data unit according to an exemplary embodiment will be described with reference to FIGS. 1 through 15, and encoding and decoding of video by inter prediction using partitions divided by an arbitrary ratio according to an exemplary embodiment will be described with reference to FIGS. 16 through 21.

Figure 1:
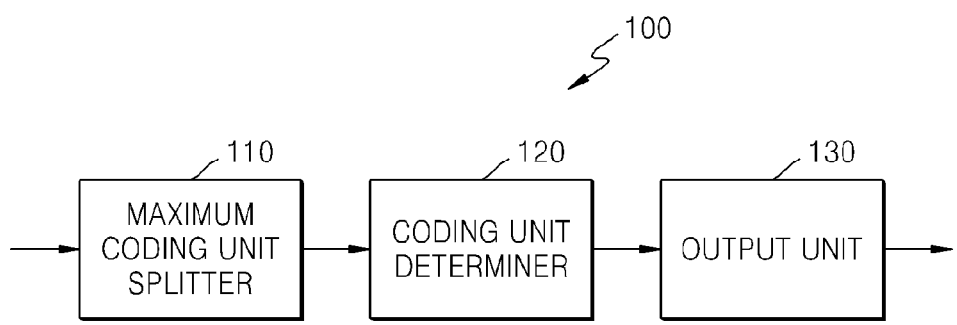
FIG. 1 is a block diagram of an apparatus for encoding a video, according to an exemplary embodiment.

FIG. 1 is a block diagram of a video encoding apparatus 100, according to an exemplary embodiment.

The video encoding apparatus 100 includes a maximum coding unit splitter 110, a coding unit determiner 120, and an output unit 130.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper encoding units according to depths may be split from the maximum coding unit to a minimum coding unit. A depth of the maximum coding unit is at an uppermost depth and a depth of the minimum coding unit is at a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit, i.e., to the number of times the maximum coding unit is split into a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

In order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will now be referred to as a 'transformation unit'. A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into $4^1$ transformation units, and the size of the transformation unit is thus N×N, and may be 2 when each of the height and width of the current coding unit is split into four equal parts, totally split into $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similarly to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 3 through 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into at least one coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined while considering characteristics of the current picture. Also, since encoding may be performed on each maximum coding unit by using any one of various prediction modes and transformations, an optimum encoding mode may be determined while considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 2:
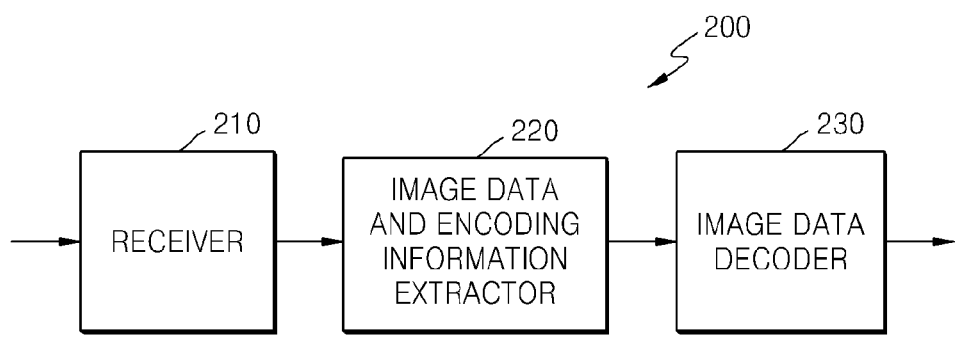
FIG. 2 is a block diagram of an apparatus for decoding a video, according to an exemplary embodiment.

FIG. 2 is a block diagram of a video decoding apparatus 200, according to an exemplary embodiment.

The video decoding apparatus 200 includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, so as to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined while considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 3 through 13.

Figure 3:
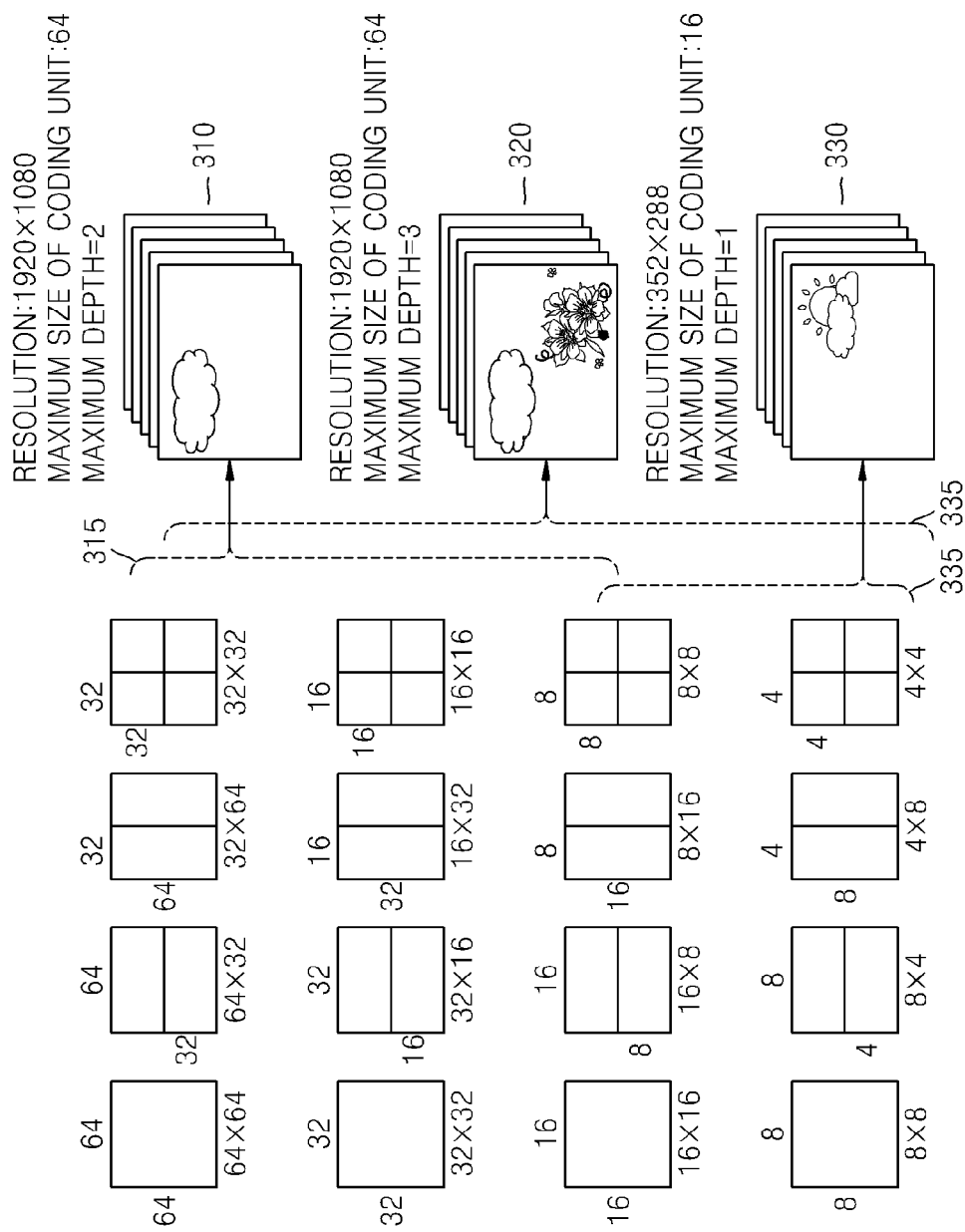
FIG. 3 is a diagram for describing a concept of coding units according to an exemplary embodiment.

FIG. 3 is a diagram for describing a concept of coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64×64, and a maximum depth is 2. In video data 320, a resolution is 1920×1080, a maximum size of a coding unit is 64×64, and a maximum depth is 3. In video data 330, a resolution is 352×288, a maximum size of a coding unit is 16×16, and a maximum depth is 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 4:
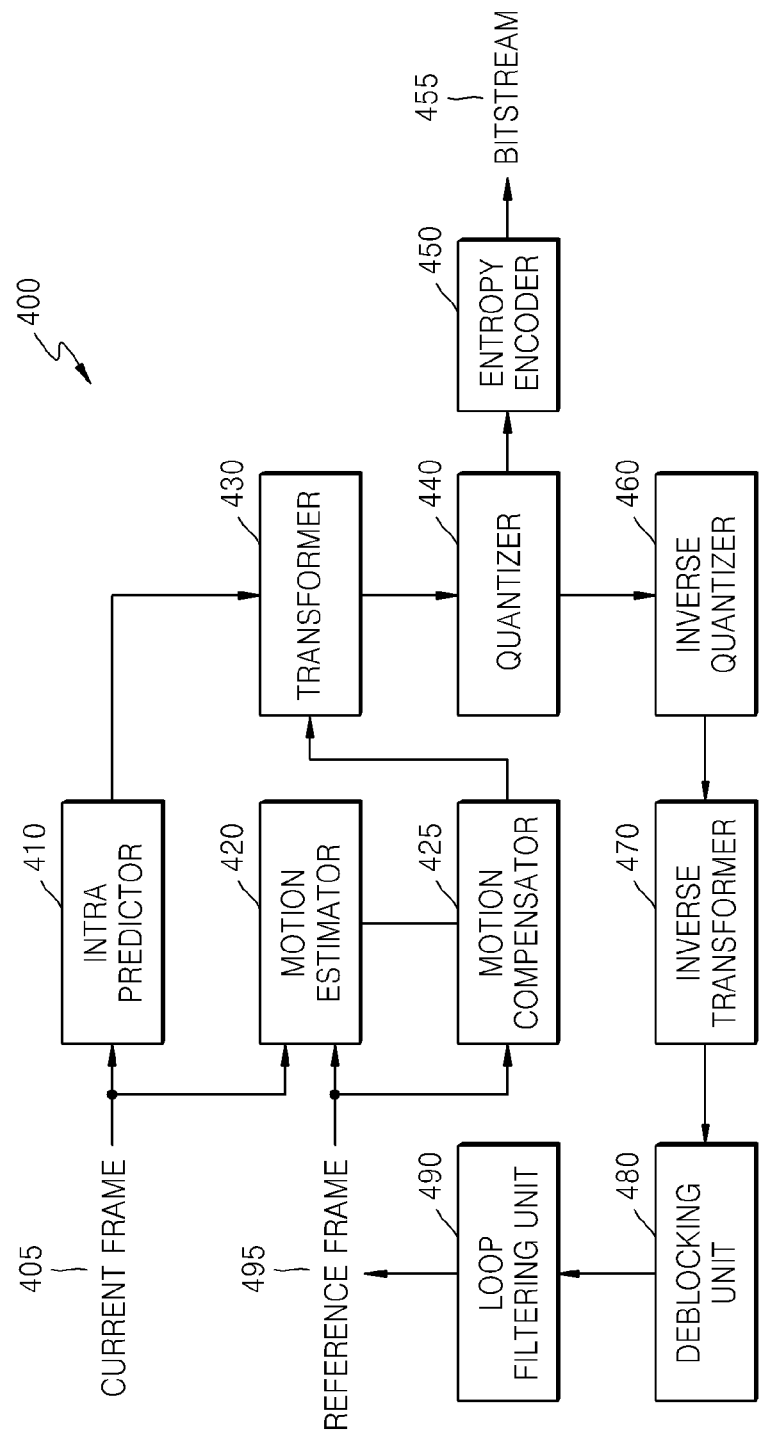
FIG. 4 is a block diagram of an image encoder based on coding units according to an exemplary embodiment.

FIG. 4 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determine partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 5:
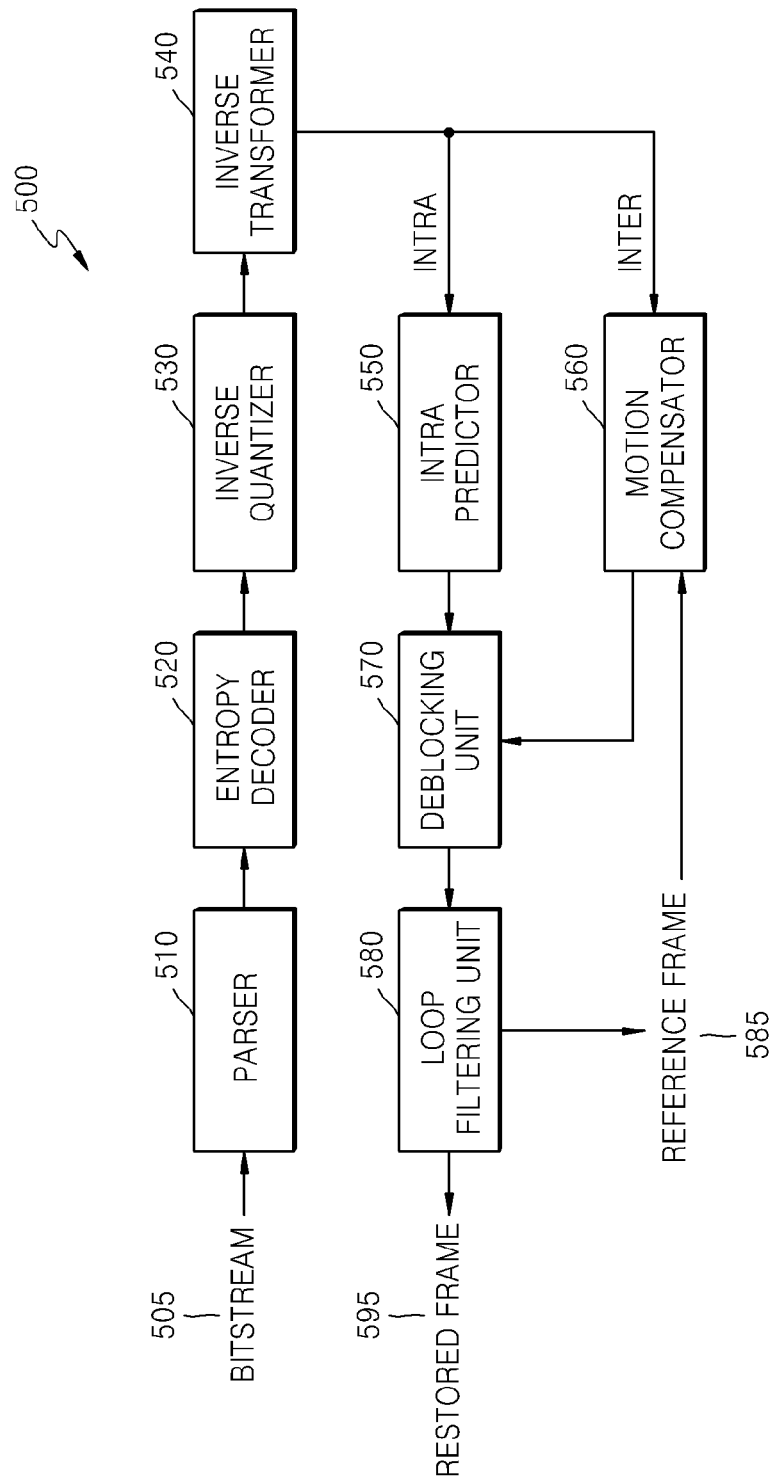
FIG. 5 is a block diagram of an image decoder based on coding units according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Figure 6:
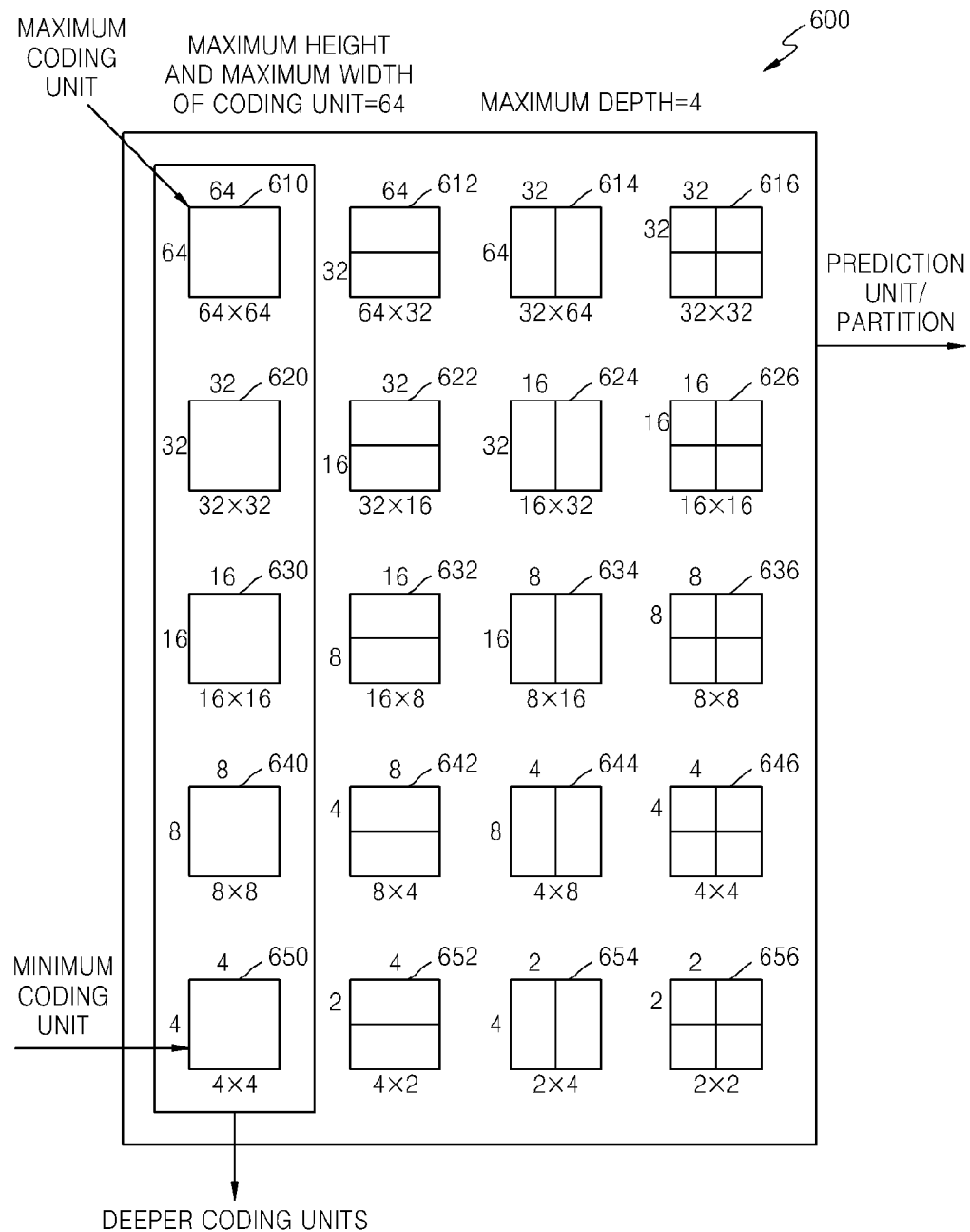
FIG. 6 is a diagram illustrating deeper coding units according to depths, and partitions according to an exemplary embodiment.

FIG. 6 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 7:
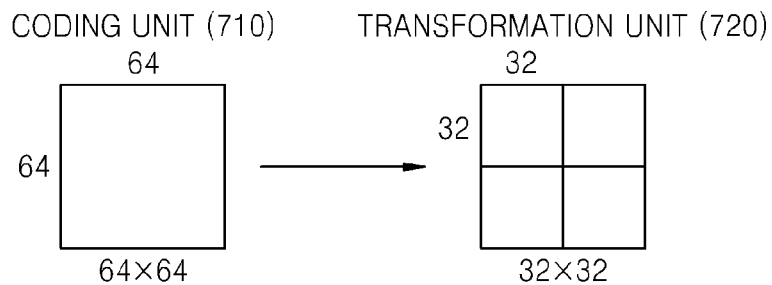
FIG. 7 is a diagram for describing a relationship between a coding unit and transformation units, according to an exemplary embodiment.

FIG. 7 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 8:
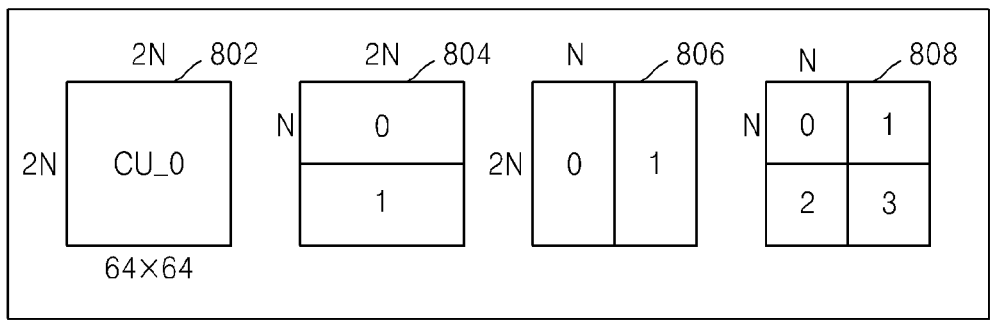
FIG. 8 is a diagram for describing encoding information of coding units corresponding to a coded depth, according to an exemplary embodiment.
Figure 8:
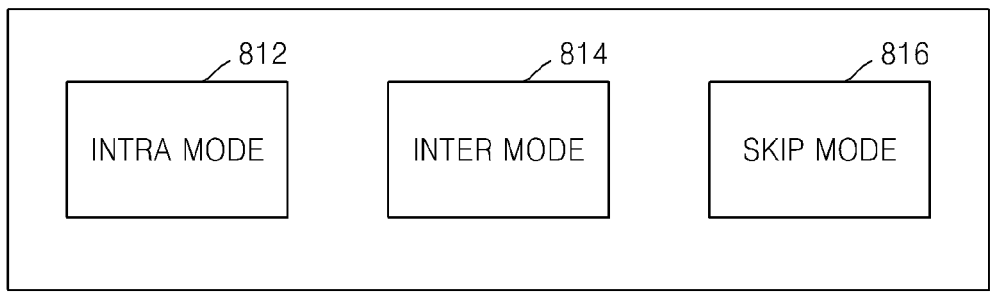
Figure 8:
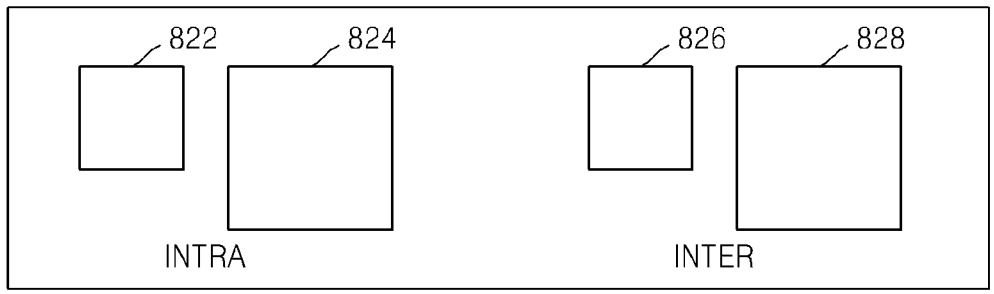

FIG. 8 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828.

Figure 9:
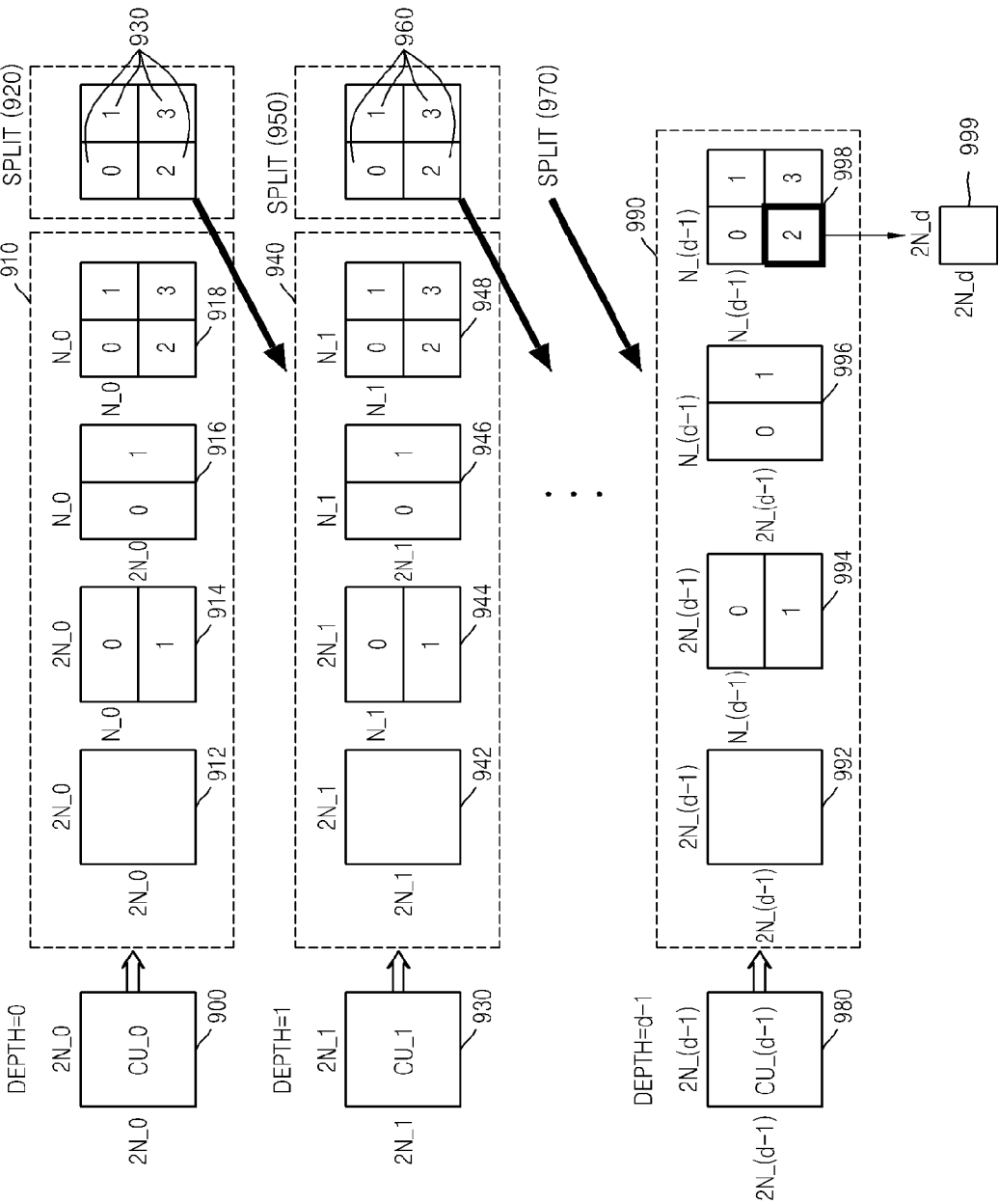
FIG. 9 is a diagram of deeper coding units according to depths, according to an exemplary embodiment.

The image data and encoding information extractor 220 of the video decoding apparatus 200 may extract and use the information 800, 810, and 820 for decoding, according to each deeper coding unit FIG. 9 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be N_(d−1)×N_(d−1). Also, since the maximum depth is d and a minimum coding unit 980 having a lowermost depth of d−1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 10:
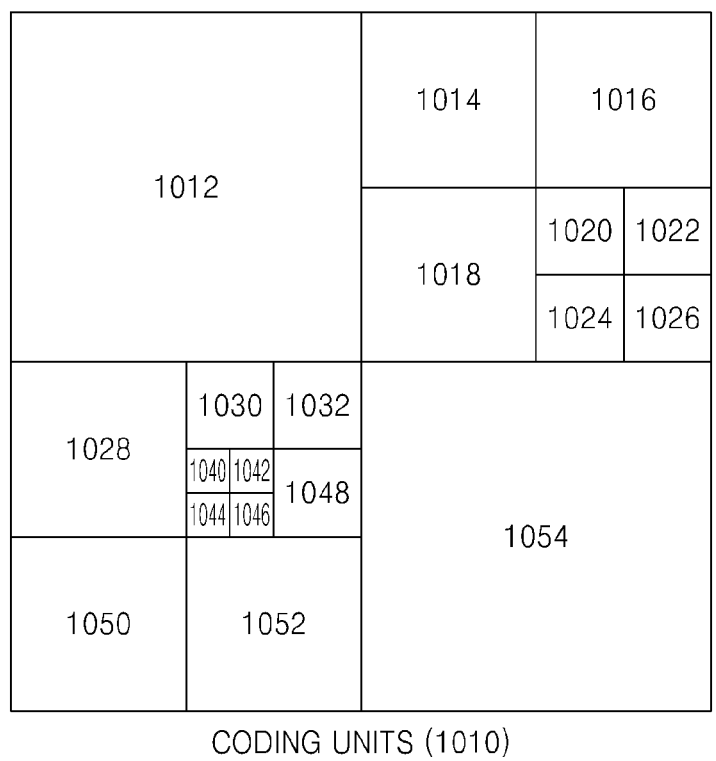
FIGS. 10 through 12 are diagrams for describing a relationship between coding units, prediction units, and transformation units, according to an exemplary embodiment.
Figure 11:
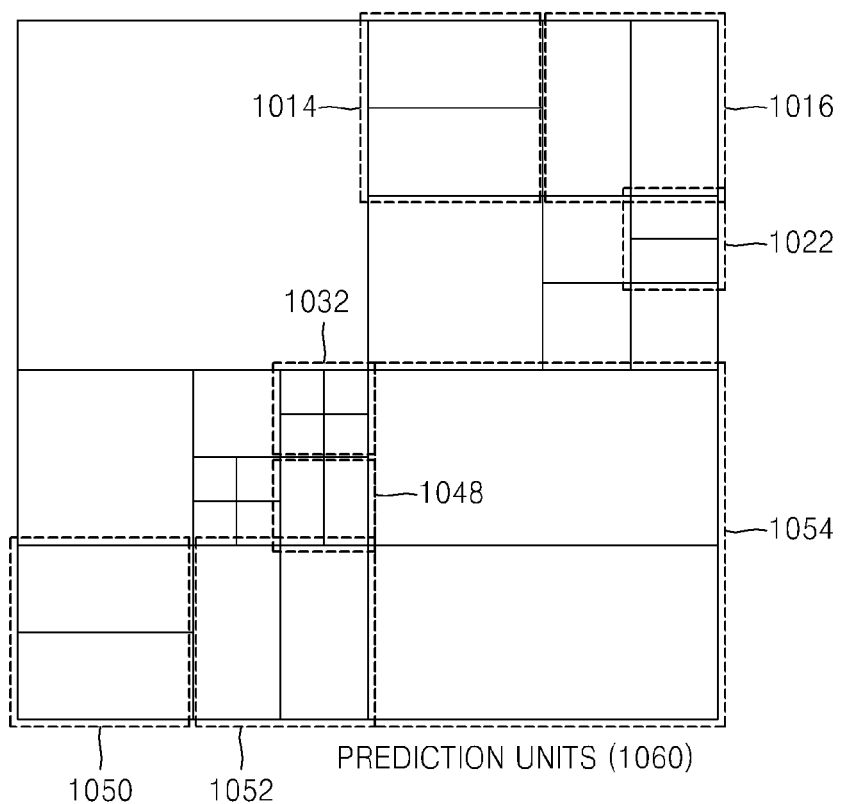
Figure 12:
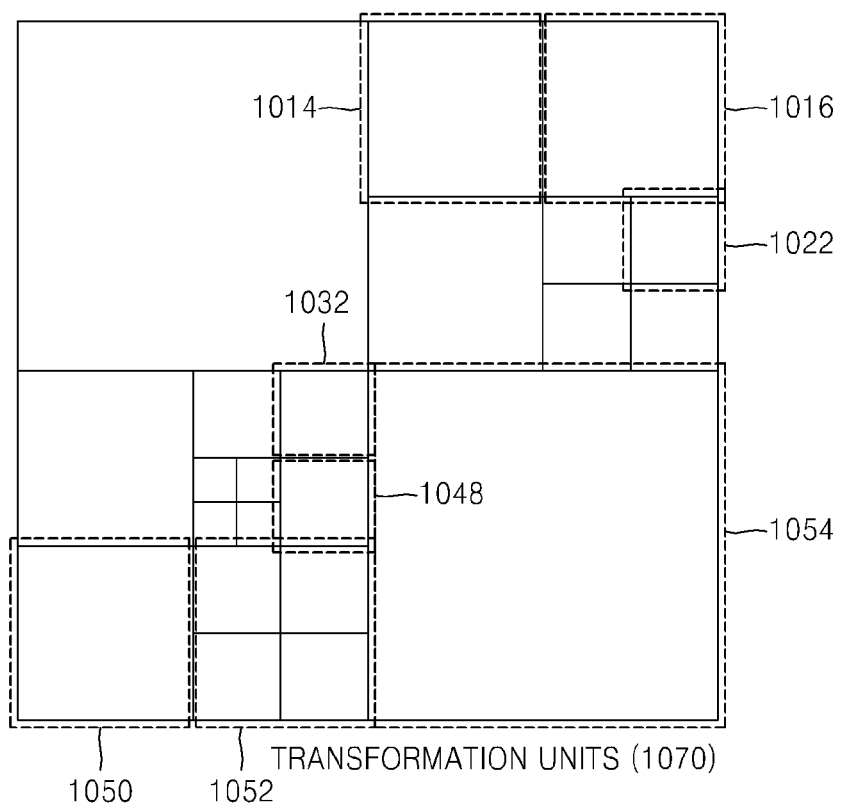

FIGS. 10 through 12 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 13:
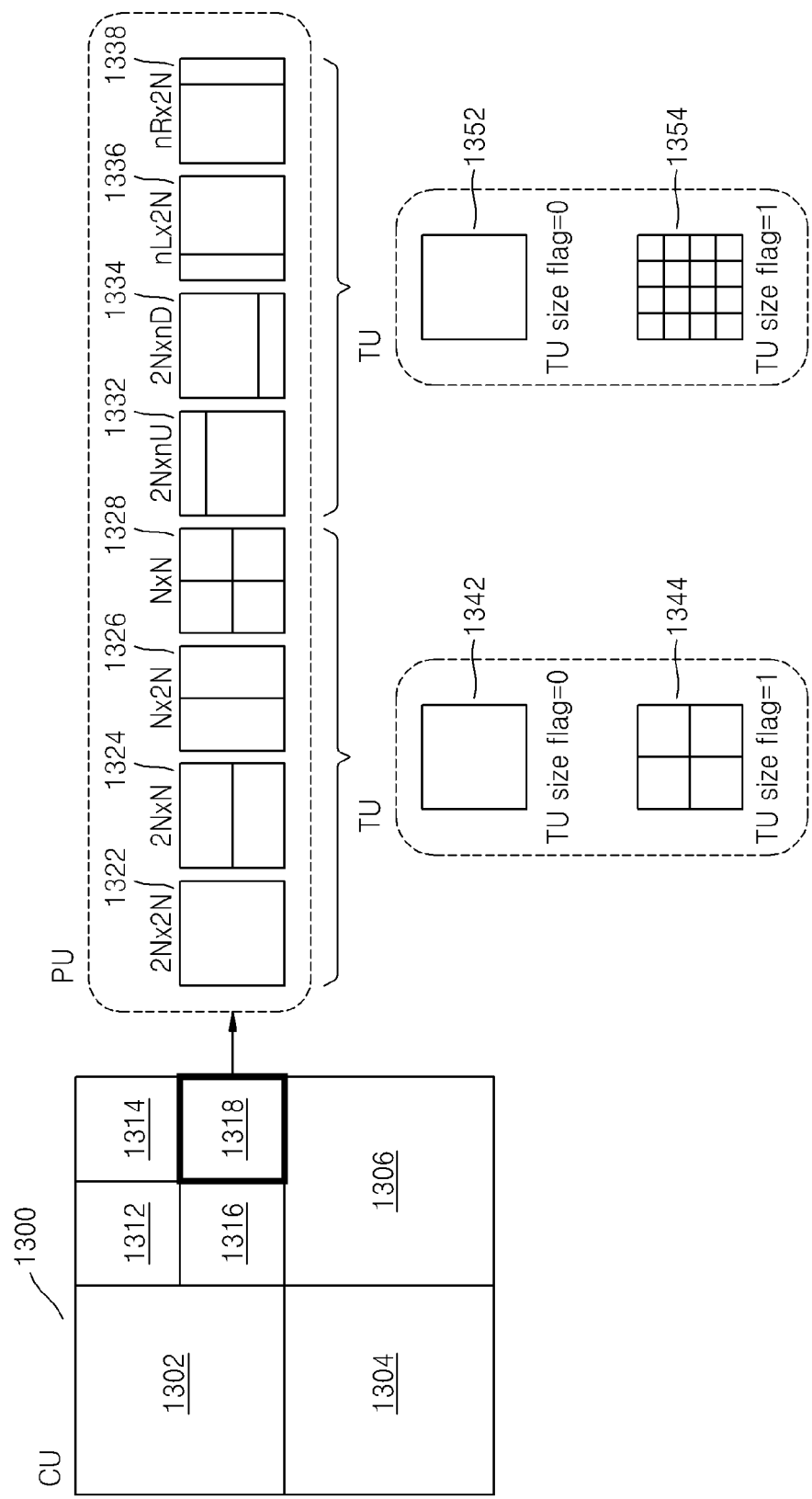
FIG. 13 is a diagram for describing a relationship between a coding unit, a prediction unit or a partition, and a transformation unit, according to encoding mode information of Table 1.

FIG. 13 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 13, the TU size flag is a flag having a value or 0 or 1, but the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag is 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and is not limited thereto.

Figure 14:
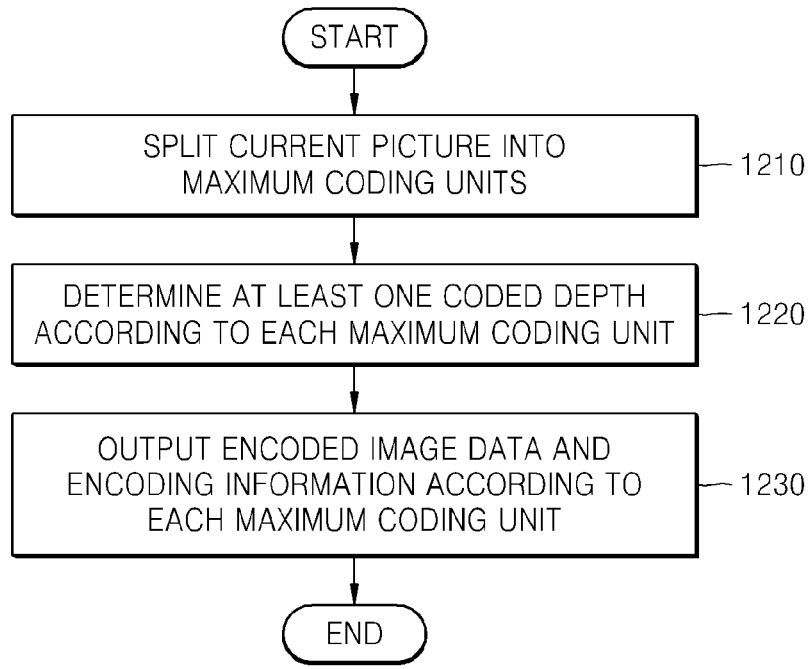
FIG. 14 is a flowchart illustrating a method of encoding a video, according to an exemplary embodiment.

FIG. 14 is a flowchart illustrating a method of encoding a video, according to an exemplary embodiment.

In operation 1210, a current picture is split into at least one maximum coding unit. A maximum depth indicating the total number of possible splitting times may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In operation 1230, encoded image data constituting the final encoding result according to the coded depth is output for each maximum coding unit, with encoding information about the coded depth and an encoding mode. The information about the encoding mode may include information about a coded depth or split information, information about a partition type of a prediction unit, a prediction mode, and a size of a transformation unit. The encoded information about the encoding mode may be transmitted to a decoder with the encoded image data.

Figure 15:
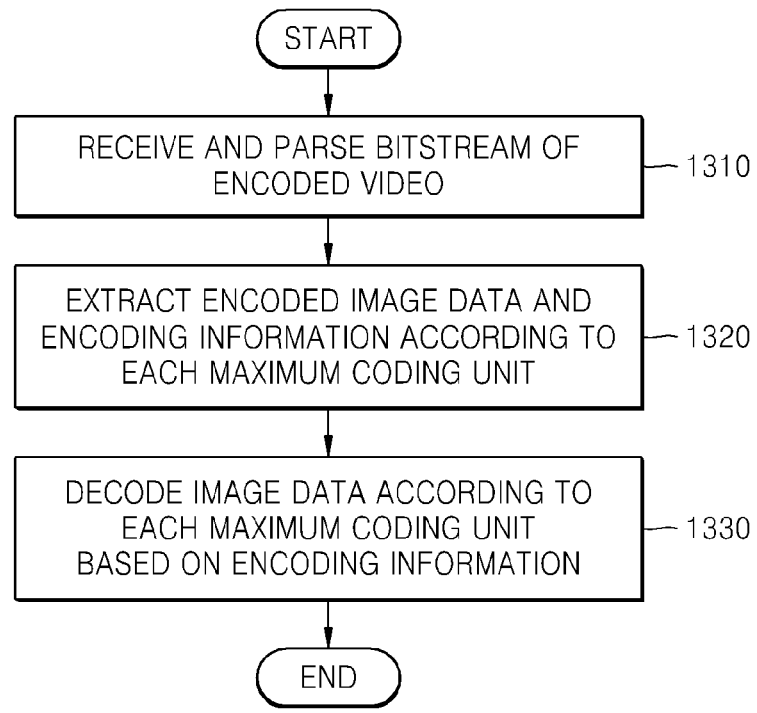
FIG. 15 is a flowchart illustrating a method of decoding a video, according to an exemplary embodiment.

FIG. 15 is a flowchart illustrating a method of decoding a video, according to an exemplary embodiment.

In operation 1310, a bitstream of an encoded video is received and parsed.

In operation 1320, encoded image data of a current picture assigned to a maximum coding unit, and encoding information about a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting the each maximum coding unit according to depths.

According to the information about the coded depth and the encoding mode, the maximum coding unit may be split into coding units having a tree structure. Each of the coding units having the tree structure is determined as a coding unit corresponding to a coded depth, and is optimally encoded as to output the least encoding error. Accordingly, encoding and decoding efficiency of an image may be improved by decoding each piece of encoded image data in the coding units after determining at least one coded depth according to coding units.

In operation 1330, the image data of each maximum coding unit is decoded based on the encoding information about the coded depth and the encoding mode according to the maximum coding units. The decoded image data may be reproduced by a reproducing apparatus, stored in a storage medium, or transmitted through a network.

Figure 16:
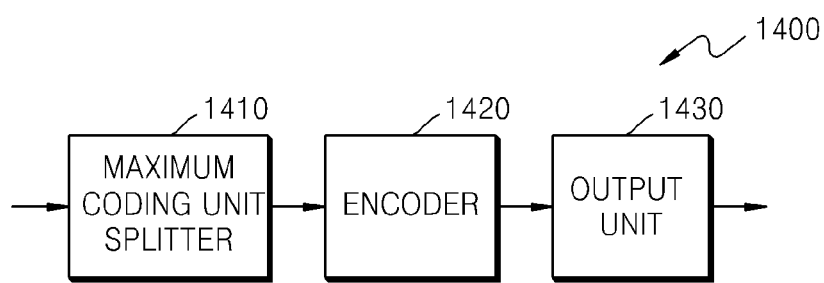
FIG. 16 is a block diagram of a video encoding apparatus with respect to inter prediction using partitions split according to arbitrary ratios, according to another exemplary embodiment.

FIG. 16 is a block diagram of a video encoding apparatus 1400 with respect to inter prediction using partitions split according to arbitrary ratios, according to another exemplary embodiment.

The video encoding apparatus 1400 includes a maximum coding unit splitter 1410, an encoder 1420, and an output unit 1430.

The maximum coding unit splitter 1410 may split video data into a maximum coding unit. The maximum video data split into the maximum coding unit is output to the output unit 1430. The maximum coding unit may be previously set in data units, such as a frame sequence, a frame, a slice, a coding unit, etc.

The maximum video data may be selectively set as at least one of blocks having respective sizes of 16×16, 32×32, 64×64, 128×128, and 256×256.

The encoder 1420 encodes the video data of the maximum coding unit split by the maximum coding unit splitter 1410. The encoder 1420 encodes the video data for at least one split region of the maximum coding unit based on deeper coding units of hierarchical structures. During an encoding operation of the deeper coding units, inter prediction is performed to search for a similar region by using partitions included in the deeper coding units and to estimate motion information of the partitions.

The inter prediction may use partitions obtained by splitting a coding unit according to arbitrary ratios. Examples of the prediction unit and partitions shown in FIGS. 3 through 13 include partitions having sizes of 2N×2N, 2N×N, N×2N, and N×N split from a coding unit having a size of 2N×2N. The encoder 1420 may perform the inter prediction according to partition types including partitions split according to arbitrary ratios or according to asymmetric ratios as well as partitions obtained by splitting the width or the height of the coding unit at a ratio of 1:1.

For example, the partitions obtained by splitting the coding unit according to arbitrary ratios may be obtained by splitting the width or the height of the coding unit at a ratio of 1:3 or 3:1. The partitions may be split at various arbitrary ratios such as 1:2, 2:1, 1:3, 3:1, 2:3, 3:2, 1:4, 4:1, etc.

The partition types may include partitions obtained by asymmetrically splitting the coding unit as well as partitions obtained by splitting the coding units according to arbitrary ratios. The partition types for the inter prediction of the coding unit may not be limited to including partitions split in a definite direction according to arbitrary ratios and may include partitions having arbitrary shapes.

The encoder 1420 may selectively determine whether to perform the inter prediction by using the partitions obtained by splitting the coding unit according to arbitrary ratios. Information indicating whether to perform the inter prediction by using the partitions obtained by splitting the coding unit according to arbitrary ratios may be separately encoded and included in a bitstream.

The encoder 1420 encodes the video data of the maximum coding unit according to split regions based on the deeper coding units according to the hierarchical structures, selects results of encoding according to depths, and selects a depth having a highest encoding efficiency. The selected depth is an encoding depth for a split region of a corresponding maximum coding unit. Information regarding the encoding depth is encoded as a result of encoding of a corresponding coding unit. The encoding depth for at least one split region within the maximum coding unit is independently determined, and thus at least one encoding depth may be determined for a single maximum coding unit.

The output unit 1430 outputs a bitstream including information regarding the encoded video data corresponding to encoding depths according to maximum coding units and split regions, the encoding depths, and encoding modes. The output unit 1430 may output the bitstream including information regarding whether the partition types for the inter prediction include the partitions obtained by splitting the coding unit according to arbitrary ratios. The information regarding whether the partition types for the inter prediction include the partitions obtained by splitting the coding unit according to arbitrary ratios may be set according to data units such as a frame sequence, a slice, a coding unit, etc. and may be included in a sequence parameter set of the bitstream, a slice header, and encoding information according to encoding units.

The coding unit may record quite a greater amount of data than that of a given macroblock, and thus a single coding unit may include regions having different image characteristics. To perform prediction encoding of the coding unit, it is preferable to split the coding unit into regions according image characteristics and generate partitions for prediction encoding the coding unit by gathering neighboring regions having the same image characteristics as a partition.

Although the video data may be split into regions having different characteristics of the image with respect to a center of the coding unit, the greater the size of the coding unit is, the higher the possibility that a boundary between distinguished regions is any one side, left, right, up or down. If only the partitions obtained by splitting the width and height of the coding unit at the ratio of 1:1 are used, to precisely perform prediction encoding on the coding unit in which the boundary between distinguished regions is one side, a current coding unit must be split into a coding unit of a lower depth so as to generate small partitions including a single independent region.

However, if the inter prediction is performed by using the partitions split according to arbitrary ratios, like the video encoding apparatus 1400 according to the present embodiment, the inter prediction is performed by using the partitions that are split to one side at a current depth without having to further split a current deeper coding unit into lower depths. Therefore, if the partitions of the coding unit include the partitions split according to arbitrary ratios or partitions having arbitrary shapes and the partitions obtained by splitting the width or height of the coding unit at the ratio of 1:1 as well, more efficient and precise prediction encoding can be performed on a large sized coding unit.

Furthermore, the prediction encoding using the partitions obtained by splitting the coding unit according to arbitrary ratios or the partitions having arbitrary shapes may be selectively performed according to the hardware performance of a video encoder/decoder, the user requirement for receiving a video encoding/decoding service, and a transmission environment of a bitstream regarding encoded video.

Figure 17:
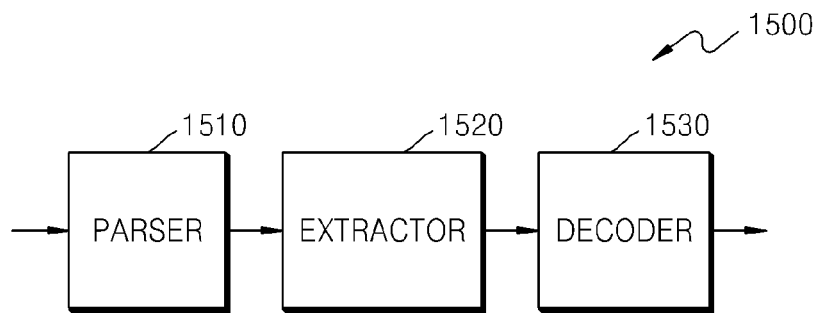
FIG. 17 is a block diagram of a video decoding apparatus with respect to inter prediction using partitions split according to arbitrary ratios, according to another exemplary embodiment.

FIG. 17 is a block diagram of a video decoding apparatus 1500 with respect to inter prediction using partitions split according to arbitrary ratios, according to another exemplary embodiment.

Referring to FIG. 17, the video decoding apparatus 1500 includes a parser 1510, an extractor 1520, and a decoder 1530. The parser 1510 receives a bitstream regarding encoded video and parses symbols of the received bitstream. The extractor 1520 extracts video data encoded according to maximum coding units and information regarding coding depths and encoding modes according to maximum coding units from the parsed bitstream.

The extractor 1520 may further extract information regarding whether a partition type for inter prediction includes partitions obtained by splitting a coding unit according to arbitrary ratios from the bitstream. The information regarding whether the partition type for inter prediction includes partitions obtained by splitting the coding unit according to arbitrary ratios may be extracted from a sequence parameter set of the bitstream, a slice header, encoding information for coding units, etc.

The decoder 1530 receives the video data and the encoding information extracted from the extractor 1520 and decodes video data based on the encoding information. More specifically, the decoder 1530 decodes the video data for a coding unit of at least one coding depth according to maximum coding units based on the information regarding the coding depths and encoding modes according to the maximum coding units.

In particular, the decoder 1530 may selectively perform motion compensation by using the partitions obtained by splitting the coding unit according to arbitrary ratios according to the information regarding whether the partition type for inter prediction includes partitions obtained by splitting the coding unit according to arbitrary ratios extracted by the extractor 1520.

That is, the decoder 1530 may perform motion compensation by using a motion vector predicted according to a partition type including partitions obtained by asymmetrically splitting the coding unit according to arbitrary ratios such as 1:2, 2:1, 1:3, 3:1, 2:3, 3:2, 1:4, 4:1, etc. and the partitions obtained by splitting the coding unit at the arbitrary ratio of 1:1 as well. Furthermore, the decoder 1530 may perform motion compensation by using partitions having arbitrary shapes as well as partitions obtained by splitting the coding unit in a direction.

The decoder 1530 may selectively perform motion compensation according to partitions having widths and heights at arbitrary ratios by determining whether inter prediction is encoded by using the partitions obtained by splitting the coding unit according to arbitrary ratios, thereby precisely restoring the coding unit distinguished with respect to regions having various characteristics of an image.

The video decoding apparatus 1500 may restore and reproduce the video data decoded according to maximum coding units.

Therefore, if prediction encoding/decoding using the partitions split according to arbitrary ratios is performed like the video encoding apparatus 1400 and the video decoding apparatus 1500, the inter prediction is performed by using the partitions that are split to one side at a current depth without having to further split a current deeper coding unit into lower depths. Therefore, the partitions split according to arbitrary ratios may be used to more efficiently and precisely perform prediction encoding or decoding on a large sized coding unit.

Figure 18:
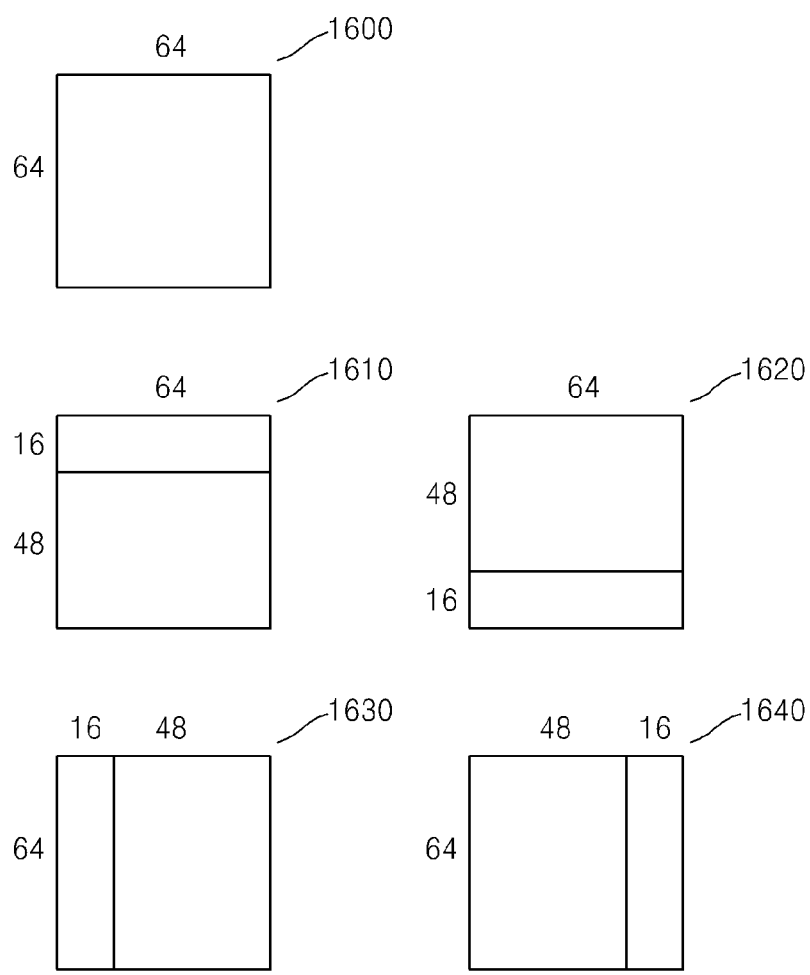
FIG. 18 is a diagram of exemplary partitions obtained by splitting a coding unit according to arbitrary ratios, according to an exemplary embodiment.

FIG. 18 is a diagram of exemplary partitions obtained by splitting a coding unit according to arbitrary ratios, according to an exemplary embodiment.

Referring to FIG. 18, a partition type for prediction encoding of the coding unit may include partitions obtained by splitting the height and width of the coding unit according to arbitrary ratios. For example, a partition type of a coding unit 1600 having a size of 64×64 may include partitions obtained by splitting the coding unit 1600 according to a ratio of 1:3 or 3:1 and partitions having sizes of 64×32, 32×64, and 32×32 obtained by splitting the height or the width of the coding unit 1600 according to a ratio of 1:1 as well.

More specifically, a partition type of the coding unit 1600 having the size of 64×64 may include partitions 1610 and 1620 having sizes of 64×16 and 64×48, respectively, obtained by splitting the height of the coding unit 1600 according to the ratio of 1:3 or 3:1. Furthermore, the partition type of the coding unit 1600 having the size of 64×64 may include partitions 1630 and 1640 having sizes of 64×16 and 64×48 obtained by splitting the width of the coding unit 1600 according to the ratio of 1:3 or 3:1.

FIG. 19 illustrates a syntax of a sequence parameter set 1700 including information regarding whether a partition type for inter prediction includes partitions obtained by splitting a coding unit according to arbitrary ratios, according to an exemplary embodiment.

Referring to FIG. 19, sequence_parameter_set is the syntax of the sequence parameter set 1700 for a current image slice. The information regarding whether the partition type for inter prediction includes partitions obtained by splitting the coding unit according to arbitrary ratios is inserted into the syntax of the sequence parameter set 1700 for the current image slice.

picture_width is syntax of a width of an input image. picture_height is syntax of a height of the input image. max_coding_unit_size is syntax of a size of a maximum coding unit. max_coding_unit_depth is syntax of a maximum depth.

An example of a sequence parameter may define information indicating whether a coding unit level is independently decoded, that is, use_independent_cu_decode_flag, information indicating whether the coding unit level is independently parsed, that is, use_independent_cu_parse_flag, an availability of a motion vector accuracy control operation, that is, use_mv_accuracy_control_flag, an availability of an arbitrary directionality intra prediction operation, that is, use_arbitrary_direction_intra_flag, an availability of a prediction encoding/decoding operation with respect to the frequency domain according to frequency transformation, that is, use_frequency_domain_prediction_flag, an availability of a rotational transformation operation, that is, use_rotational_transform_flag, an availability of encoding/decoding using a tree significance map, that is, use_tree_significant_map_flag, an availability of an intra prediction encoding operation using a multi-parameter, that is, use_multi_parameter_intra_prediction_flag, an availability of an improved motion vector prediction encoding operation, that is, use_advanced_motion_vector_prediction_flag, an availability of an adaptive loop filtering operation, that is, use_adaptive_loop_filter_flag, an availability of an adaptive loop filtering operation of a quadtree structure, that is, use_quadtree_adaptive_loop_filter_flag, an availability of a quantization operation using a delta value of a quantization parameter, that is, use_delta_qp_flag, an availability of a random noise generation operation, that is, use_random_noise_generation_flag, and information indicating whether partitions having arbitrary partitions for inter prediction of a coding unit are allowed, that is, use_arbitrary_motion_partition_flag.

In particular, according to the availability of the adaptive loop filtering operation, that is, use_adaptive_loop_filter_flag, and the availability of the adaptive loop filtering operation of the quadtree structure, that is, use_quadtree_adaptive_loop_filter_flag, the sequence parameter set 1700 may define a filter length of the adaptive loop filter, that is, alf_filter_length, a type of the adaptive loop filter, that is, alf_filter_type, a reference value for quantization of an adaptive loop filter coefficient, that is, alf_qbits, and the number of color components of the adaptive loop filtering, that is, alf_num_color.

Information regarding correlations between a depth of a coding unit, a coding tool, and an operating mode that are used in the video encoding apparatus 1400 and the video decoding apparatus 1500 may include an operating mode mbp_mode[uiDepth] of inter prediction corresponding to a depth uiDepth of a coding unit and an operating mode significant_map_mode[uiDepth] indicating a type of a significant map among tree significant maps. More specifically, the sequence parameter set 1700 may set the correlations between the inter prediction and a corresponding operating mode according to the depth of the coding unit or the correlations between encoding/decoding using the tree significant map and a corresponding operating mode.

The sequence parameter set 1700 may also set a bit depth of an input sample input_sample_bit_depth and a bit depth of an internal sample internal_sample_bit_depth.

The video decoding apparatus 1500 may read a sequence parameter, extract the information indicating whether partitions having arbitrary partitions for inter prediction of the coding unit are allowed, that is, use_arbitrary_motion_partition_flag, from the read sequence parameter, and determine whether to perform inter prediction using partitions obtained by splitting a coding unit of a corresponding sequence according to arbitrary ratios.

The information indicating whether partitions having arbitrary partitions for inter prediction of the coding unit are allowed, that is, use_arbitrary_motion_partition_flag, which is used by the video encoding apparatus 1400 and the video decoding apparatus 1500, is not limited to the sequence parameter set 1700 of FIG. 22, and may be encoded/decoded in units of a maximum coding unit, a slice, a frame, a picture, a GOP, etc.

If the information indicating whether partitions having arbitrary partitions for inter prediction of the coding unit are allowed, that is, use_arbitrary_motion_partition_flag, and has a true value in a slice header, the inter prediction is performed using partitions obtained by splitting the coding unit according to arbitrary ratios in a corresponding slice. If the information has a false value, the inter prediction is performed using partitions obtained by splitting the width or the height of the coding unit according to a ratio of 1:1 in the corresponding slice.

FIG. 20 is a flowchart illustrating a video encoding method with respect to inter prediction using partitions split according to arbitrary ratios, according to another exemplary embodiment.

Referring to FIG. 20, in operation 1810, video data is split into a maximum coding unit.

In operation 1820, the video data of the maximum coding unit is encoded based on deeper coding units of hierarchical structures according to at least one split region of the maximum coding unit, and a coding depth at which an encoding result is to be output is determined. Inter prediction may selectively use partitions obtained by splitting a coding unit according to arbitrary ratios. Whether to perform inter prediction using the partitions obtained by splitting the coding unit according to arbitrary ratios may be set according to data units such as a frame sequence, a frame, a slice, a coding unit, etc.

In operation 1830, a bitstream including the encoded video data corresponding to coding depths for split regions according to maximum coding units and encoding information regarding the coding depth and encoding modes is output. Information indicating whether inter prediction is performed by using the partitions obtained by splitting the coding unit according to arbitrary ratios may be encoded and inserted into a bitstream and then the bitstream may be output.

FIG. 21 is a flowchart illustrating a video decoding method with respect to inter prediction using partitions split according to arbitrary ratios, according to another exemplary embodiment.

Referring to FIG. 21, in operation 1910, a bitstream regarding encoded video data is received and symbols of the bitstream are parsed.

In operation 1920, the encoded video data according to maximum coding units, and encoding information regarding coding depths and encoding modes according to maximum coding units are extracted from the bitstream. Information indicating whether inter prediction is performed using partitions obtained by splitting a coding unit according to arbitrary ratios may be extracted from the bitstream. The information indicating whether inter prediction is performed using the partitions obtained by splitting the coding unit according to arbitrary ratios may be extracted from a sequence parameter set, a slice header, coding information for coding units, etc.

In operation 1930, decoding including motion compensation using the partitions obtained by splitting the coding unit according to arbitrary ratios may be performed for a coding unit of at least one coding depth according to maximum coding units based on the information regarding the coding depths and encoding modes according to the maximum coding units. Whether to perform decoding including motion compensation using the partitions obtained by splitting the coding unit according to arbitrary ratios may be selectively performed according to the information indicating whether inter prediction is performed using partitions obtained by splitting the coding unit according to arbitrary ratios extracted from the bitstream.

If inter prediction using the partitions split according to arbitrary ratios is performed like the video encoding method and the video decoding method of the present embodiments, the inter prediction is performed by using the partitions that are split to one side at a current depth without having to further split a current deeper coding unit into lower depths.

Furthermore, whether the partitions of the coding unit include the partitions split according to arbitrary ratios or partitions having arbitrary shapes as well as the partitions obtained by splitting the width or height of the coding unit according to the ratio of 1:1 may be selected, and thus the conventional encoding/decoding system that does not support partitions split according to arbitrary ratios can use the video encoding method and the video decoding method of the present embodiments. Therefore, more efficient and precise prediction encoding may be selectively performed according to the video encoding and decoding methods of the present embodiments.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Exemplary embodiments can also be implemented as computer processors and hardware devices.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of decoding a video, the method comprising:
   parsing asymmetric partition information indicating whether partition types include asymmetric partition types, from a bitstream of an encoded image;
   determining at least one coding unit included in a maximum coding unit by using split information parsed from the received bitstream;
   determining at least one prediction unit of a coding unit among the at least one coding unit, by using the asymmetric partition information and information about a partition type of the coding unit parsed from the received bitstream; and
   performing motion compensation using the prediction units for the coding unit,
   wherein the determining at least one prediction unit comprises:
   when the asymmetric partition information indicates that the partition types include the asymmetric partition types, determining the at least one prediction unit according to a particular type among the partition types including asymmetric partition types and symmetric partition types, by using information about a partition type of the coding unit; and
   when the asymmetric partition information indicates that the partition types do not include the asymmetric partition types, determining the at least one prediction unit according to a particular type among the partition types including symmetric partition types by using the information about a partition type of the coding unit.

2. The method of claim 1, wherein the partition type comprises symmetric partition types 2N×2N, 2N×N, N×2N and N×N which indicate symmetric prediction units obtained by splitting at least one of a height and a width of the coding unit according to a ratio of 1:1, and asymmetric partition types 2N×nU, 2N×nD, nL×2N, nR×2N which indicate the asymmetric prediction units obtained by splitting one of a height and a width of the coding unit according to a ratio of 1:3 or 3:1.

3. The method of claim 2, wherein, when the asymmetric partition information indicates that the partition types include asymmetric partition types, the partition type indicates one of 2N×2N, 2N×N, N×2N, N×N, 2N×nU, 2N×nD, nL×2N and nR×2N, and
   when the asymmetric partition information indicates that the partition types do not include asymmetric partition types, the partition type indicates one of 2N×2N, 2N×N, N×2N and N×N.

4. The method of claim 1, wherein the partitions are rectangles obtained by splitting at least one of a height and a width of the coding unit according to a symmetric ratio or by splitting one of a height and a width of the coding unit according to an asymmetric ratio,
   the image is split into a plurality of maximum coding units, according to information about a maximum size of a coding unit,
   the maximum coding unit is hierarchically split into one or more coding units of depths according to the split information,
   a coding unit of a current depth is one of rectangular data units split from a coding unit of an upper depth,
   when the split information indicates a split for the current depth, the coding unit of the current depth is split into coding units of a lower depth, independently from neighboring coding units, and
   when the split information indicates a non-split of the current depth, the partitions are obtained from the coding unit of the current depth.

* * * * *